United States Patent [19]

Olson et al.

[11] Patent Number: 4,881,574

[45] Date of Patent: Nov. 21, 1989

[54] ENCLOSED ROTARY DISC AIR PULSER

[75] Inventors: A. L. Olson; Tom A. Batcheller, both of Idaho Falls; J. A. Rindfleisch; John M. Morgan, both of Arco, all of Id.

[73] Assignee: The United States of America as represented by the Department of Energy, Washington, D.C.

[21] Appl. No.: 231,427

[22] Filed: Aug. 12, 1988

[51] Int. Cl.⁴ .............................................. F16K 11/06
[52] U.S. Cl. ............................. 137/624.13; 137/625.21
[58] Field of Search ...................... 137/624.13, 625.21; 91/39

[56] References Cited

U.S. PATENT DOCUMENTS

| | | | |
|---|---|---|---|
| 7,023 | 1/1850 | Kennish | 137/625.21 |
| 1,084,410 | 1/1914 | Drennon | 137/625.21 X |
| 2,477,590 | 8/1949 | Ferwerda et al. | 137/624.13 X |
| 3,361,121 | 1/1968 | Schott | 91/470 X |
| 3,948,286 | 4/1976 | Dunbar et al. | 137/625.21 X |
| 4,272,265 | 6/1981 | Snyder | 137/624.13 X |
| 4,286,500 | 9/1981 | Stevenson | 137/625.21 X |
| 4,478,248 | 10/1984 | De Vall et al. | 137/624.13 |

FOREIGN PATENT DOCUMENTS

| | | | |
|---|---|---|---|
| 317999 | 1/1902 | France | 137/625.21 |
| 379782 | 7/1973 | U.S.S.R. | 137/624.13 |
| 907323 | 2/1982 | U.S.S.R. | 137/624.13 |
| 2020399 | 11/1979 | United Kingdom | 137/624.13 |

Primary Examiner—Gerald A. Michalsky
Attorney, Agent, or Firm—James W. Weinberger; Thomas G. Anderson; Judson R. Hightower

[57] ABSTRACT

An enclosed rotary disc air pulser for use with a solvent extraction pulse column includes a housing having inlet, exhaust and pulse leg ports, a shaft mounted in the housing and adapted for axial rotation therein, first and second disc members secured to the shaft within the housing in spaced relation to each other to define a chamber therebetween, the chamber being in communication with the pulse leg port, the first disc member located adjacent the inlet port, the second disc member being located adjacent the exhaust port, each disc member having a milled out portion, the disc members positioned on the shaft so that as the shaft rotates, the milled out portions permit alternative cyclical communication between the inlet port and the chamber and the exhaust port and the chamber.

11 Claims, 6 Drawing Sheets

4,881,574

ENCLOSED ROTARY DISC AIR PULSER

CONTRACTUAL ORIGIN OF THE INVENTION

The U.S. Government has rights to this invention pursuant to Contract No. DE-AC07-84ID12435 with the U.S. Department of Energy.

BACKGROUND OF THE INVENTION

The present invention relates to pulse columns used in solvent extraction processes, and more specifically, to an air pulser for use in regulating the air flow to a pulse leg connected to a pulse column, particularly as used in nuclear reactor fuel by-product extraction systems.

Solvent extraction is a conventional method used in reprocessing nuclear fuel. Once the spent fuels are dissolved into an aqueous solution, valuable by-products of the fission process can be recovered and separated from each other in significant quantities, and impurities may be reduced by many orders of magnitude.

The application of solvent extraction in nuclear fuel reprocessing involves a sequence of transfers of one or more solutes from a liquid phase to an essentially immiscible phase. The distribution of the solutes between the two phases is governed by principles of physical chemistry which are more or less well understood.

In such separation, the radioactive solutes ordinarily enter the system in an aqueous phase. At least some of the solutes are extracted into an organic phase, sometimes called the solvent. The organic or solvent phase may consist of a single substance, but frequently it contains one or more extractants and may include a diluent and sometimes a diluent modifier. The extracted solutes are subsequently removed from the organic phase by adjustment of chemical conditions such that stripping, also known as back extraction, occurs into an aqueous phase separate from the original feed stream.

Typical solvent extraction apparatus may be described as a series of interconnecting chambers in a linear arrangement or cascade. The aqueous phase is fed into the cascade at one end and the organic phase or the solvent is fed into the cascade at the opposite end. Thus, the aqueous phase and the organic phase move through the cascade in a continuous and counter-current flow pattern, with the aqueous and organic components interacting with each other in each chamber. In each chamber of the cascade, a portion of the desirable fission by-products is extracted into the solvent and thus removed from the aqueous phase. The cascade is designed so that the aqueous phase inlet and organic phase outlet are at the same end, and the aqueous phase outlet and the organic phase inlet are located together at the opposite end. At the aqueous phase outlet end, substantially all of the desirable products have been removed from the aqueous phase. Further, at the organic phase outlet end, the organic solvent is withdrawn from the cascade in a substantially loaded condition, with the desirable products contained therein. Subsequent chemical processing operations are used to further separate the fission products from the solvent solution.

Among the mechanisms generally used to practice solvent extraction is the pulse column. A pulse column is a liquid-liquid contactor having a cylindrical body or tower in which the rate of mass transfer is enhanced by hydraulic pulsation of the liquids in the column through a series of perforated plates.

In conventional pulse columns, a rapid reciprocating motion of relatively short amplitude is applied to the liquid contents of the column. An air pulser is normally employed to power this reciprocating motion and the consequential interaction of the aqueous and organic phases. Air pulse agitation has been found to give improved rates of extraction and to reduce tower heights compared to the dimensions of the former packed column apparatus. Consequently, when used in the processing of nuclear fuels and other radioactive chemical operations, the reduced size of pulse columns reduces the initial expense of installation as well as the cost of massive shielding.

Pulse columns also have a lower liquid retention capacity and therefor solvent degradation by radiation damage is decreased. Further, pulse columns provide a means of agitation not requiring moving parts, bearings and the like which come in contact with highly corrosive radioactive liquids. The amplitude and frequency of pulsations may be altered or varied depending on the application. Pulse frequency refers to the rate of application of the pulse action in terms of cycles/time, and pulse amplitude refers to the linear distance between extreme positions of the liquid in the column during pulsing.

In a conventional pulse column, a complex mechanical pulser assembly is provided, having an inlet valve and an exhaust valve. The assembly includes an electronic frequency controller to activate a four way solenoid valve which controls air flow to two-way pneumatic cylinders, one cylinder being provided for the inlet valve and one for the exhaust valve. Each cylinder is connected to a corresponding poppet valve, one each being respectively associated with the air inlet and exhaust conduits. In the first phase of the cycle, the assembly is adapted to open the air inlet valve and close the exhaust valve simultaneously, the increase in air pressure forcing liquid down the pulse leg. In the next phase of the pulse cycle, the inlet valve closes and the exhaust valve opens, venting the air from the pulse leg.

A significant disadvantage of the conventional air pulser assembly is inadequate venting of the pulse leg, which causes deviation from prescribed operational parameters. In addition, the conventional dual cylinder pulsing system is a relatively complex mechanical apparatus which suffers from reliability problems due to the substantial number of moving parts. Mechanical breakdowns have more impact when operating in the radioactive and corrosive environment of nuclear processing plants. Also, cycling efficiency suffers due to the interplay of mechanical parts. When the conventional air pulser system breaks down, the operation of the entire pulse column is suspended.

Thus, there is a need for a pulsing apparatus for use in a pulse column which has a minimum of operating parts and which is both reliable and accurate.

SUMMARY OF THE INVENTION

Accordingly, the rotary disc air pulser of the present invention provides an air pulsing apparatus designed to have a minimum of moving parts for greater operational accuracy and reliability. To this end, the rotary disc air pulser of the invention replaces the conventional dual cylinder-dual valve pulser mechanism with a housing containing a central rotatable shaft. A pair of circular discs, designated inlet and exhaust discs, each being provided with a milled out portion, is positioned on the shaft in spaced relationship to each other to create a chamber therebetween. The discs are positioned on the shaft so that the respective milled out portions are out of phase with each other. The inlet disc is positioned adjacent an inlet port of the housing, the exhaust disc is positioned adjacent the exhaust port of the housing. The discs are positioned so that when the milled out portion of the inlet disc is aligned with the inlet port, the exhaust disc sealingly closes off the exhaust port. Conversely, when the shaft rotates so that the exhaust disc adjacent the exhaust port is in communication therewith, the inlet disc moves to sealingly close off the inlet port. The chamber located between the two discs is in communication with the pulse column so that the rotation of the shaft alternately introduces air into the column and exhausts waste air therefrom on a cyclical basis.

DESCRIPTION OF THE PREFERRED EMBODIMENT

Figure 1:
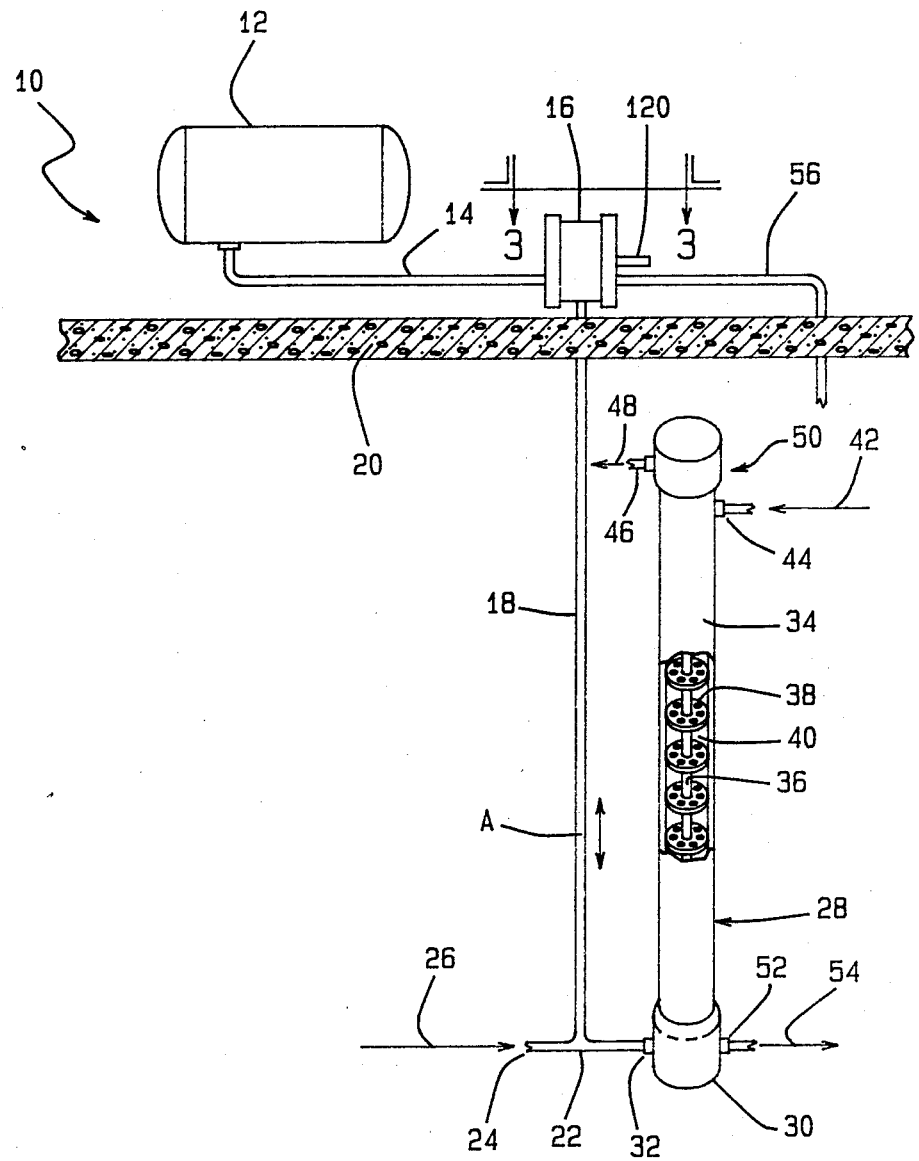
FIG. 1 is a diagrammatic representation of a pulse column as employed in a nuclear processing plant and employing the rotary disc air pulser of the invention.

Referring now to the drawings, wherein like reference characters designate identical features, FIG. 1 depicts an air-driven pulse extractor column system indicated generally by the reference numeral 10. The system 10 includes an air reservoir 12 containing a supply of compressed air, which is connected via an appropriate conduit 14 to the rotary disc air pulser of the invention, designated generally by the reference numeral 16.

The pulser 16 is connected to a column pulse leg 18 which passes through a concrete shielded housing 20 which is specially adapted to prevent an escape of radioactivity therethrough. Once inside the housing 20, the column pulse leg 18 is provided with a 'T' junction 22 configured to permit the introduction of an organic feed stream through a conduit 24. The organic feed stream is represented by an arrow 26.

A level of pulse fluid located within the column pulse leg 18 is indicated at 'A'. The flow in the column pulse leg 18 and the organic feed stream 26 are combined and introduced to a pulse column 28 at the lower end 30 thereof through an organic feed stream inlet 32. The pulse column 28 is shown partially cut away in order to facilitate explanation of the interior thereof.

The column 28 generally includes an outer housing 34 defining a substantially elongate cylindrical shape in which a fixed shaft 36 is coaxially positioned. A plurality of foraminous or perforated discs 38 are located upon the shaft 36 in spaced relation to each other and define a plurality of pulse column chambers 40.

An aqueous solution of spent fuel 42 is introduced through, an inlet 44. The inlet 44 and an outlet 46 are preferably located at the upper end 50 of the column 28.. The flow of organic solvent with extracted product and some fission by-products is removed from the column 28 through the organic outlet 46. The flow of organic material from the column 28 is represented by an arrow 48.

At the lower end 30 of the column 28, the aqueous phase outlet is indicated at 52 and the flow of aqueous solution is represented by an arrow 54. An exhaust conduit 56 connects the pulser 16 to the interior of the shielded housing 20 so that exhaust air which may be contaminated with radioactive particles is not emitted into the atmosphere. Thus, the aqueous and solvent solutions 42 and 26 are introduced at opposite ends of the column 28 and flow therethrough countercurrently. Mixing of the two solutions occurs in each chamber 40 through the action of the pulser 16, which cyclically pressurizes the pulse leg 18. Pulsations in the pulse leg 18 create corresponding pulses in the column 28, causing agitation of the column contents.

Figure 2:
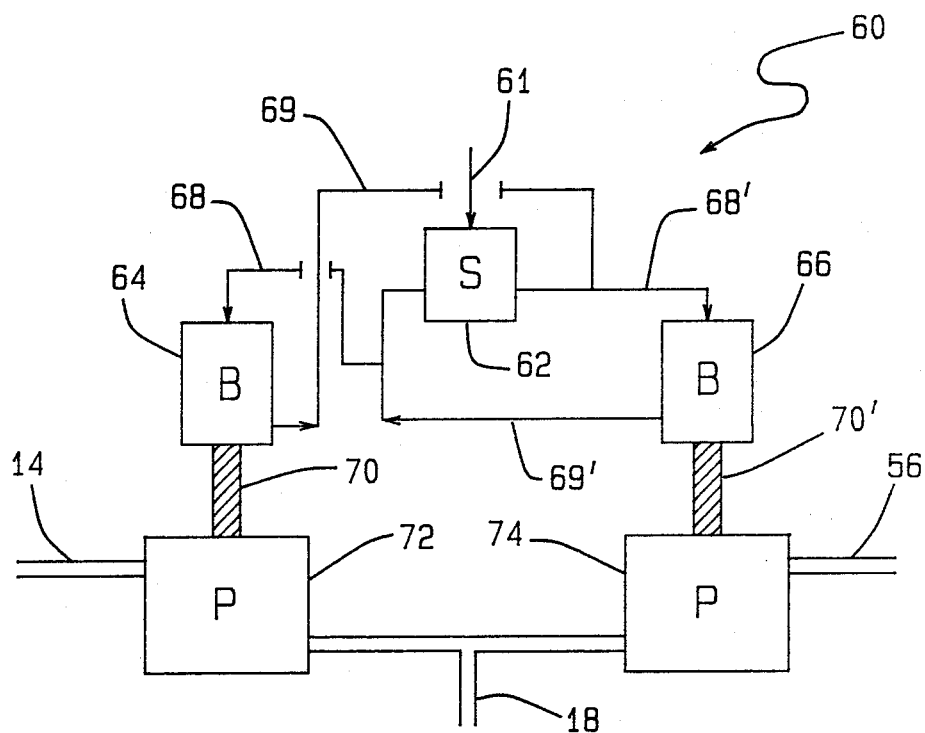
FIG. 2 is a block diagram representation of a prior art air pulser apparatus.

Referring now to FIG. 2, a prior art air pulser is indicated generally by the reference numeral 60. In response to a triggering signal represented by the arrow 61, a solenoid valve 62 located within the pulser 60 selectively controls a pair of dual acting fluid power cylinders 64 and 66 which, in the conventional pulser 60, are pneumatic cylinders. Each cylinder 64, 66 is connected to the solenoid by input conduits 68 and 68' and outflow conduits 69 and 69'. It will be observed from FIG. 2 that the outflow conduit 69 of the cylinder 64 is connected to the inflow conduit 68' of the cylinder 66, and the outflow conduit 69' of the cylinder 66 is connected to the inflow conduit 68 of the cylinder 64. Thus, the cylinders 64, 66 are adapted for alternating cyclical operation. Each cylinder 64, 66 has a respective piston 70 and 70' which is connected to a respective poppet valve 72, 74. The poppet valve 72 controls the flow of air through the conduit 14 and into the inlet of the air pulser 60, and the poppet valve 74 controls the flow of air from the pulser 60 into the exhaust conduit 56.

In operation, it has been found that the pulser 60 is prone to frequent breakdowns due to the rather complicated mechanisms described hereinabove, which, in addition to normal wear and tear expected in such devices, are susceptible to corrosion from the radioactive and chemical environment. Whenever the pulser 60 is shut down for repairs, the entire pulse column 28 must also be shut down.

Figure 3A:
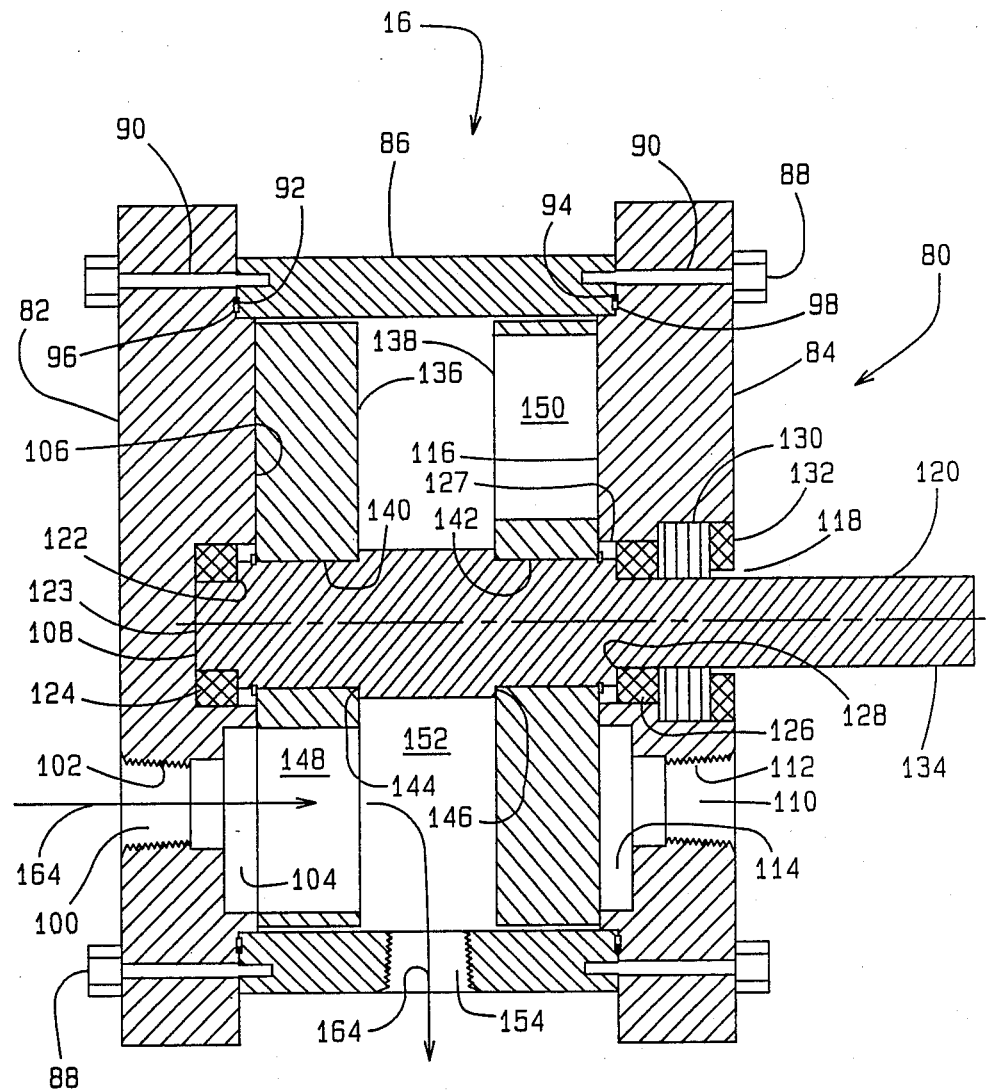
FIG. 3a is a sectional elevational view taken along the lines 3—3 of FIG. 1 and in the direction generally indicated, wherein the rotary disc air pulser of the invention is shown in the open inlet position.
Figure 3B:
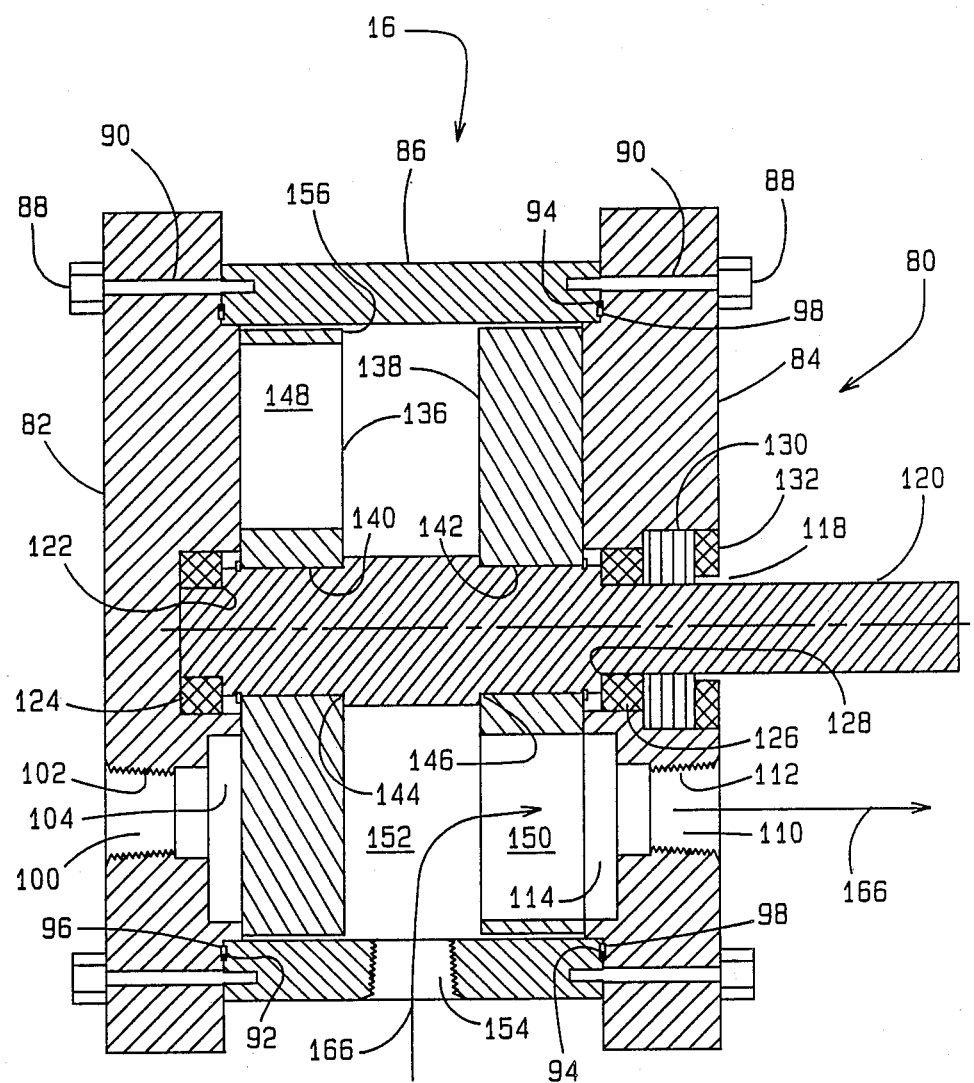
FIG. 3b is a sectional elevational view taken along the lines 3—3 of FIG. 1 and in the direction generally indicated, wherein the rotary disc air pulser of the invention is shown in the open exhaust position.

Referring now to FIGS. 3a and 3b, the rotary disc pulser 16 of the invention is shown in greater detail. FIG. 3a represents the pulser in the open inlet position and FIG. 3b represents the pulser in the open exhaust position. The pulser 16 includes a housing 80 having a pair of end plates 82 and 84 located at each open end of a substantially cylindrical section of pipe 86. The end plates 82, 84 and the pipe section 86 are all preferably manufactured of a grade of stainless steel suitable for corrosion resistance.

The end plates 82, 84 are each secured to the pipe section 86 by means of threaded fasteners 88, each of which is inserted through an at least partially threaded bore 90 which passes through either of the end plates 84 and 82 and into the section 86. It is preferred that a plurality of fasteners 88 be positioned around the periphery of each end plate 82, 84 to effect a sealing relationship thereto. To ensure a proper seal between the section 86 and the end plates 82, 84, a pair of 0-rings 92 and 94 are located within annular 0-ring seats 96 and 98.

The end plate 82 is provided with an inlet port 100 having inner threads 102 for the attachment of the air conduit 14 (FIG. 1) in sealing relationship thereto. The end plate 82 is also provided with a recess 104 located in the inner face 106 thereof, the recess 104 designed to be in communication with the port 100. The inner surface 106 is also provided with a bearing seat and shaft recess 108.

In similar fashion to the end plate 82, the end plate 84 is provided with an exhaust port 110 having inner threads 112 designed so that the exhaust conduit 56 (FIG. 1) may be sealingly secured thereto. The end plate 84 (FIG. 3a) is also provided with a recess 114 located on an inner surface 116 thereof, the recess 114 adapted to be in communication with the port 110 in similar fashion to the recess 104. In the preferred embodiment, the ports 100, 110 and the recesses 104, 114 are located directly opposite each other within the housing 80, although other arrangements are contemplated.

The end plate 84 is further provided with an axial bore 118 which is adapted to accommodate the stepped drive shaft 120 for axial rotation therein. The shaft 120 includes an end step 122 adjacent the end 123 of the shaft adjacent the port 100. The step 122 is adapted to accommodate a race of roller bearings 124 to facilitate axial rotation of the shaft 120 within the housing 80. A second set of roller bearings 126 is located within a recess 127 in the end plate 84. The bearings 126 are also adapted to facilitate axial rotation of the shaft 120 and to engage a step 128 in the shaft 120. Appropriate conventional packing 130 is located within the bore 118 adjacent the bearing 126 and is retained therein by a packing retaining nut 132. The shaft 120 is also provided with a drive end 134 which is connected to an appropriate motor (not shown) such as an electric or internal combustion motor, usually equipped with a gear reducer.

The pulser 16 is further provided with a pair of valve members or discs, which will be designated as the inlet disc 136 and the exhaust disc 138. Each disc 136, 138 is a substantially planar sheet of rigid material, preferably stainless steel. The discs 136, 138 are each provided with a respective axial bore 140, 142 which is adapted to engage a respective step 144, 146 on the shaft 120.

In addition, each disc 136, 138 is provided with a respective milled out portion 148, 150. The discs 136, 138 are positioned upon the shaft 120 so that the milled out portions 148, 150 are located out of phase with each other. In the preferred embodiment, the portions 148, 150 are located approximately 180°, or diametrically out of phase with each other. The discs 136, 138 are also located upon the shaft 120 so as to define a central chamber 152 therebetween. The chamber 152 is adapted to be in communication with the pulse column 18 (best seen in FIG. 1) by means of a pulse port 154 located in the central section 86 of the housing 80.

Figure 4:
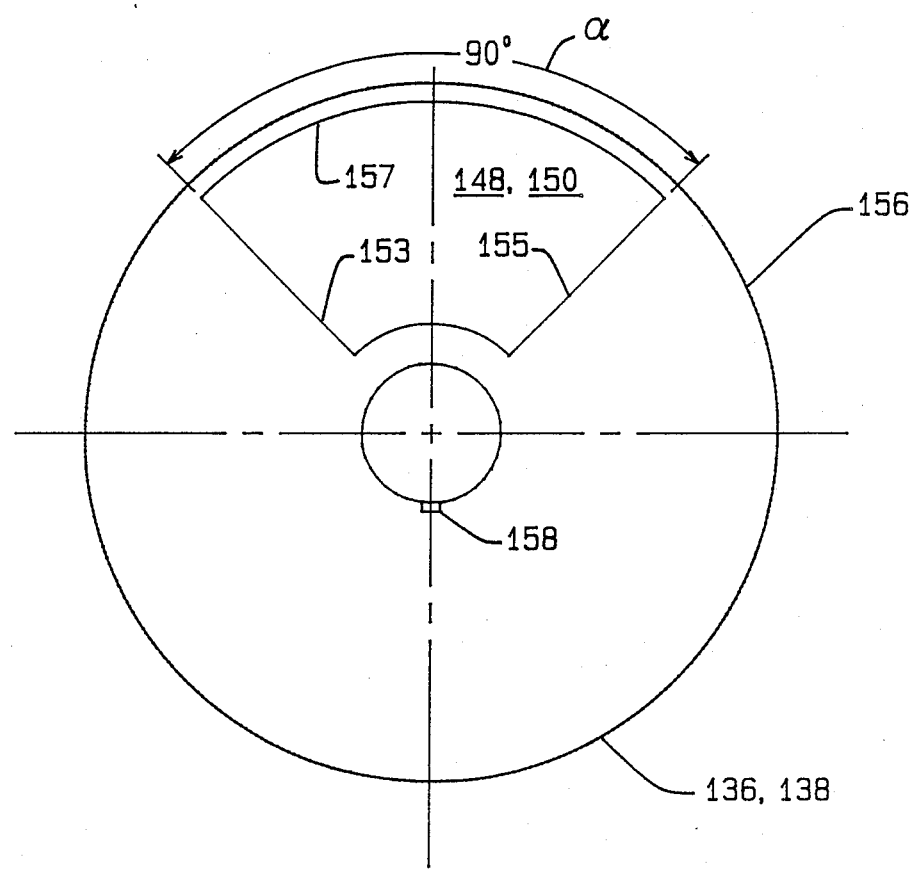
FIG. 4 is a front elevational view of a disc as employed in the rotary disc air pulser as depicted in FIGS. 3a and 3b.

Referring to FIG. 4, a representative disc 136 or 138 is shown. The disc pictured may be either the inlet or exhaust discs 136 or 138 in that they are preferably of identical configuration to minimize production costs. It is preferred that the milled out portions 148, 150 define an angle '$\alpha$' in the approximate range of 85° to 95° within the periphery of the discs 136, 138. In the preferred embodiment, $\alpha$ is approximately 90°. The milled out portions are defined by radial edge margins 153 and 155 of the disc 136, 138. The outer extremity of each milled out portion 148, 150 is defined by an arcuate edge 157 of the disc 136, 138. The edge 157 is located on the disc spaced inwardly from the outer periphery 156 thereof so that the disc's outer periphery remains continuous in order to maintain a substantially sealing relationship within the section 86. If desired, the discs 136, 138 may be provided with a keyway 158 to be used with a conventional key (not shown) to fix their position upon the shaft 120.

Figure 5:
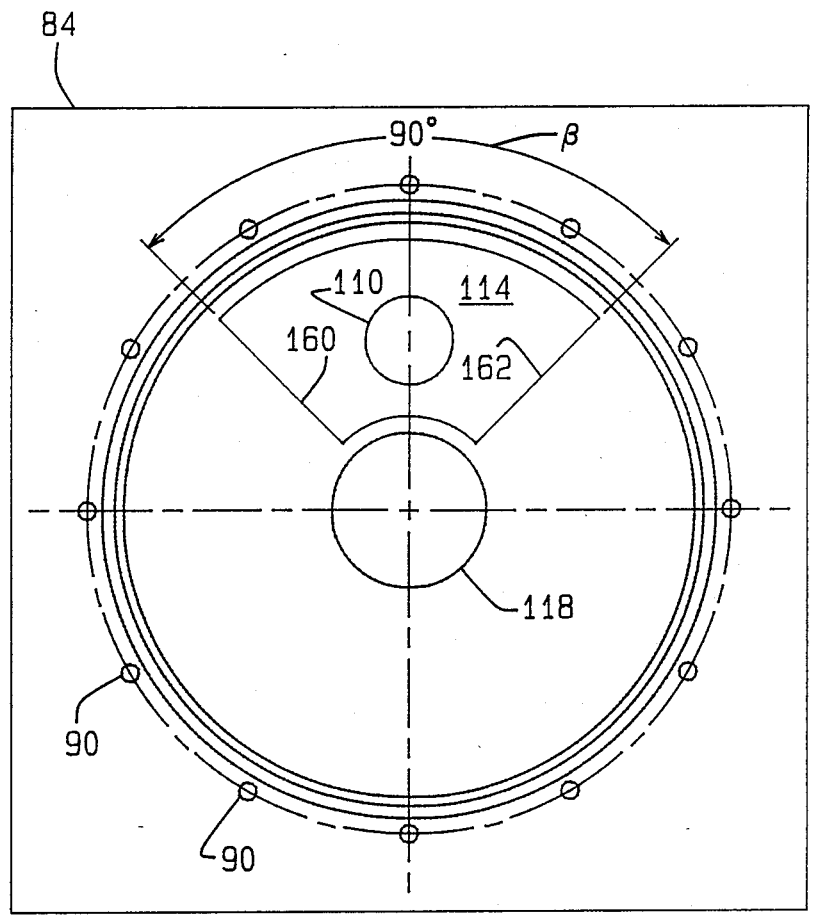
FIG. 5 is a front elevational view of an end plate of the rotary disc air pulser as depicted in FIGS. 3a and 3b.

Referring now to FIG. 5, the end plate 84 is shown. The recess 114 is defined by a pair of radial edges 160, 162 which define an angle '$\beta$'. In the preferred embodiment, the angle $\beta$ is in the approximate range of 85° to 95° with best results achieved when $\beta$ is 90°. The end plate 84 differs from the end plate 82 only in that the throughbore 118 is substituted for the shaft and bearing seat 108. It will be evident that the recess 114 is substantially coextensive with the milled out portion 150 to improve air flow through the pulser 16. The recess 104 and the milled out portion 148 in the end plate 82 are similarly dimensioned.

In operation, and referring now to FIGS. 1 and 3a, in the first half of the pulser cycle or the inlet phase, an air pulse represented by the arrows 164 is introduced into the inlet port 100 through the conduit 14 (best seen in FIG. 1) and enters the central chamber 152 by means of the milled out portion 148 which has been rotated to be in communication with the inlet port 100. In the inlet phase, the disc 138 is positioned so that the port 110 is sealingly blocked. Thus, the air pulse 164 is forced to exit the chamber 152 and to pass through the pulse port 154 into the column pulse leg 18. Once in the column pulse leg 18, the air pulse intercepts the level of liquid 'A' to cause a corresponding movement of liquid in the column 28. The reaction of the liquid within the column 28 to the impact of the pulse generates a like return movement of the liquid in the leg 18 back to point A, creating an exhaust pulse. This movement of liquid within the column 28 causes agitation within the chambers 40 of the pulse column 28.

Referring now to FIGS. 1 and 3b, the next half of the pulser cycle is the exhaust phase, wherein the drive shaft 120 is axially rotated approximately 180 degrees so that the disc 136 is now positioned to sealingly block the intake port 100. Also, the disc 138 is positioned so that its milled out portion 150 is in communication with the exhaust port 110. Thus, the exhaust air pulse represented by the arrows 166 is transmitted through the column pulse leg 18 and passes through the port 154 and enters the chamber 152, where it is diverted through the milled out portion 150, the exhaust port 110 and into the exhaust conduit 56 (best seen in FIG. 1). The pulser 16 is controlled by a control circuit (not shown) so that the rotational velocity of the shaft 120 will vary as to the desired cycling frequency of the pulse extractor system 10. The range of operational frequency of the pulser 16 is between 18 and 120 cycles per minute. A faster rotational velocity of the shaft 120 will increase the frequency of pulses. In addition, the volume of air passed through the air conduit 14 as a function of pressure will determine the amplitude of the respective pulse. Thus, it will be seen that the present rotary air pulser provides a substantially maintenance free, relatively simple alternative to conventional prior art pulse systems.

While a preferred embodiment of a rotary disc air pulser in accordance with the present invention has been illustrated and defined, it will be understood that changes and modifications may be made therein without departing from the invention in its broader aspects. Various features of the invention are defined in the following claims.

The embodiments of this invention in which an exclusive property or privilege is claimed are defined as follows:

1. An enclosed rotary disc air pulser for controlling the flow of a non-lubricating source of air comprising:
 a housing a first end plate with an inlet port, a second end plate with an exhaust port and a central section disposed between said end plates and having a pulse leg port;
 and elongated shaft mounted in said housing and adapted for axial rotation therein;
 first and second disc members, each said disc member being fixedly secured to said shaft within said housing in spaced relation to each other between said first and second end plates and on opposing sides of said pulse leg port so as to define an undivided chamber therebetween, said chamber being in communication with said pulse leg port, each said disc member having a substantially identical milled out portion defining a single opening and being positioned upon said shaft, said milled out portions being diametrically out of phase with each other so that as said shaft rotates, said disc members permit alternating cyclical communication of the non-lubricating source of air through said milled out portions and between said inlet port and said chamber and said exhaust port and said chamber.

2. The apparatus of claim 1 wherein said first and second end plates each have a recess on an inner face thereof, said recesses being in communication with said inlet and exhaust ports, respectively, and being substantially coextensive with said milled out portion.

3. The apparatus of claim 2 wherein each of said discs has an outer peripheral margin, and said respective milled out portion of each said disc is defined in part by a pair of radial edge margins of said disc, and an outer peripheral edge of said milled out portion is defined by an arcuate edge of said disc, said arcuate edge being spaced inwardly from said outer peripheral margin of said disc.

4. The apparatus of claim 3 wherein said radial edge margins of said disc define a 90° arc therebetween.

5. The apparatus of claim 1 wherein said first disc member is located adjacent said inlet port and said second disc member is located adjacent said exhaust port.

6. The apparatus of claim 1 further including drive means for said shaft.

7. An enclosed rotary disc air pulser for controlling the flow of an non-lubricating source of air, comprising:
 a housing having a central portion with an annular wall and first and second opposing end plates, said first end plate having an inlet port and a recess on an inner face of said plate being in communication with said inlet port, said second end plate having a exhaust port and a recess on an inner face of said plate being in communication with said exhaust port, said central portion having a pulse leg port in said annular wall, said inlet and exhaust ports being substantially coaxial;
 an elongate shaft mounted in said housing for axial rotation therein, an end of said shaft protruding through said housing;
 a first disc member having a milled out portion defining a single opening and being fixedly secured to said shaft within said housing adjacent said inlet port;
 a second disc member having a milled out portion defining an opening and being fixedly secured to said shaft within said housing adjacent said exhaust port, said open milled out portions in said first and second disc members being substantially identical in configuration;
 said milled out portions being substantially coextensive with said recesses to improve air flow through said pulser;
 said first and second disc members being located in spaced relationship to each other between said end plates and on opposite sides of said pulse leg port and defining an undivided chamber therebetween, said chamber being in communication with said pulse leg port; and
 said disc members being positioned upon said shaft with said milled out portions being diametrically out of phase with each other so that as said shaft rotates, said milled out portions permit cyclical alternating communication of the non-lubricating source of air between said inlet port and said chamber, and said exhaust port and said chamber.

8. The apparatus of claim 7 wherein said inlet and exhaust ports are positioned in close relation to said pulse leg port.

9. The apparatus of claim 7 further including drive means for said shaft.

10. The apparatus of claim 7 wherein each of said discs has an outer peripheral margin, and said respective milled out portion of each said disc is defined in part by a pair of radial edge margins of said disc, and an outer peripheral edge of said milled out portion is defined by an arcuate edge of said disc, said arcuate edge being spaced inwardly from said outer peripheral margin of said disc.

11. The apparatus of claim 10 wherein said radial edge margins of said disc define a 90° arc therebetween.

* * * * *